United States Patent [19]
Cowen, Jr.

[11] 3,782,515
[45] Jan. 1, 1974

[54] SHAFT DRIVER DEVICE AND CONVEYOR SYSTEM EMBODYING THE SAME

[75] Inventor: William E. Cowen, Jr., Westland, Mich.

[73] Assignee: United Industrial Engineering Corporation, Madison Heights, Mich.

[22] Filed: Sept. 30, 1970

[21] Appl. No.: 72,884

Related U.S. Application Data

[62] Division of Ser. No. 698,533, Jan. 17, 1968, Pat. No. 3,605,990.

[52] U.S. Cl............................. 192/56 C, 64/30 E
[51] Int. Cl............................................. F16d 43/20
[58] Field of Search...................... 192/56 C, 41 S; 64/30 E; 81/52.4 R

[56] References Cited
UNITED STATES PATENTS

| | | | |
|---|---|---|---|
| 2,468,193 | 4/1949 | Goff | 81/52.4 R X |
| 1,561,537 | 11/1925 | Hayes | 192/56 C X |
| 2,626,029 | 1/1953 | Gutterman | 192/56 C |
| 2,885,873 | 5/1959 | Beeston, Jr. | 192/84 PM X |
| 3,339,819 | 9/1967 | Gollos | 192/84 PM X |
| 3,636,277 | 1/1972 | Pohler | 192/84 PM |

*Primary Examiner*—Allan D. Herrmann
*Attorney*—Whittemore, Hulbert and Belknap

[57] ABSTRACT

A shaft driver device is disclosed for use, illustratively, in a roller-type load conveyor or like system in which load units are halted for the performance of an operation thereon, with a consequent increased drag on a normally powered roller of the conveyor which is driven by the device. The system and drive device incorporate means which acts quite independently of any control factor, other than the drag effect, to interrupt the drive of the conveyor roller, or equivalent element in a different installation, immediately upon the arising of drag in excess of a critical value, restoring the drive when that value diminishes or the drag ceases. The drive control means referred to is built in its entirety into the structure of a driven roller or other shaft-driven component comparable thereto.

More specifically, the system comprises a first hub member normally rotating with the driver shaft and powered from an appropriate source, a second hub member coaxial with the first member, and means in the form of a torsion spring clutch device normally coupling said members for rotation as a unit under a drag load less than the critical value. The first member is shown as having a resilient driving connection to the second member which, on excess load, yields and causes the torsion spring coupling means to be de-clutched, the shaft drive then coming to a halt. This drive connection is adjustable as to its resilient bias to determine the critical value.

4 Claims, 11 Drawing Figures

PATENTED JAN 1 1974　　3,782,515
SHEET 1 OF 3
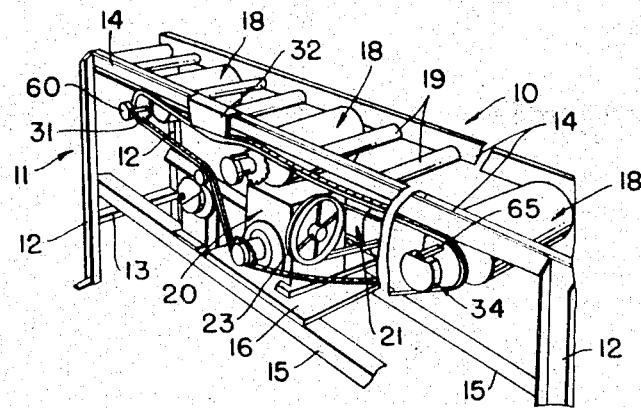
FIG.1
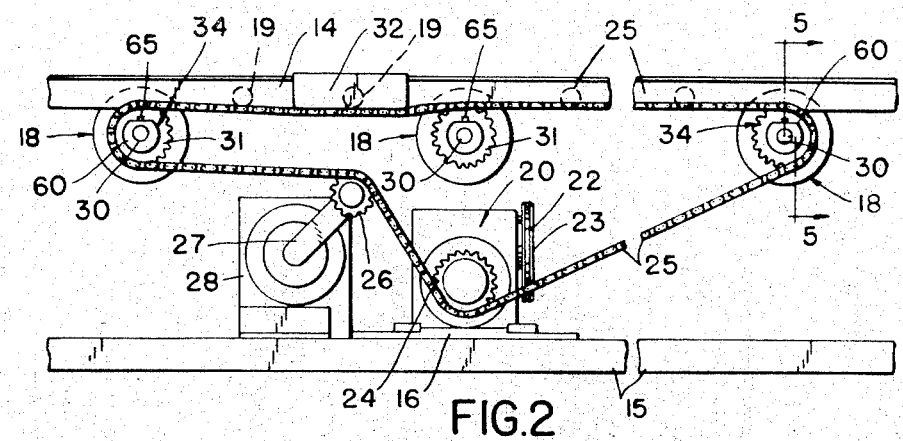
FIG.2
FIG.3
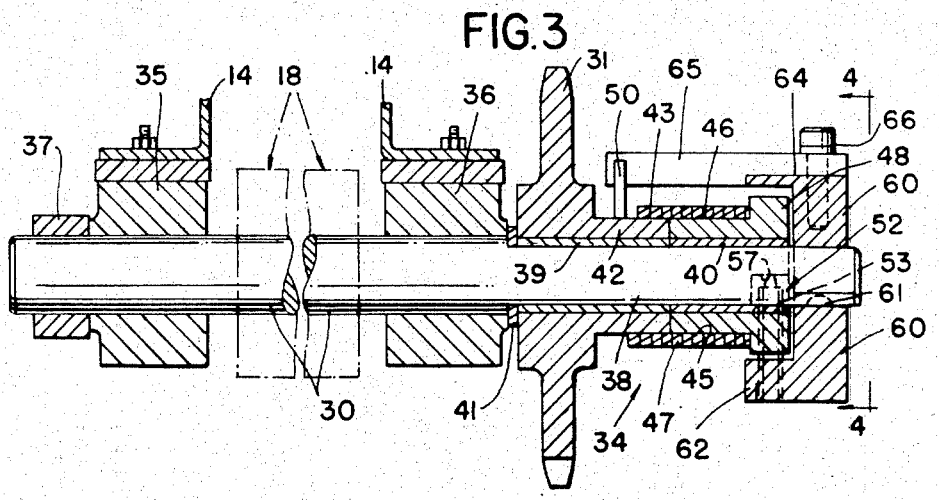

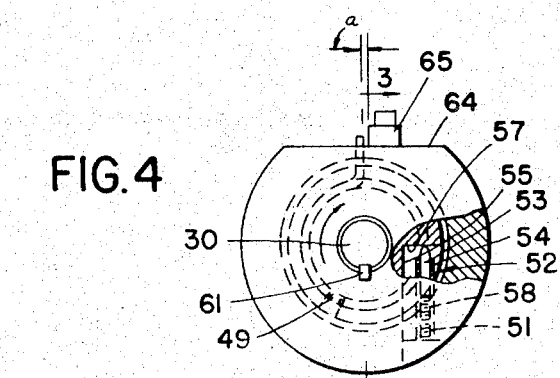
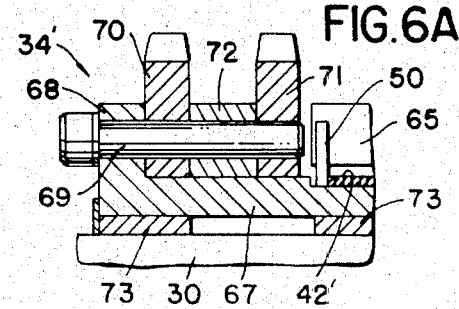
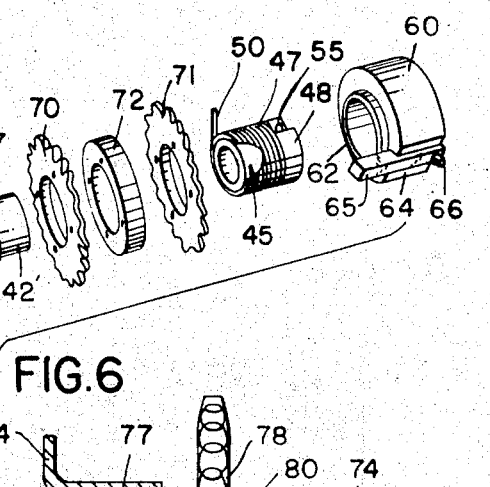
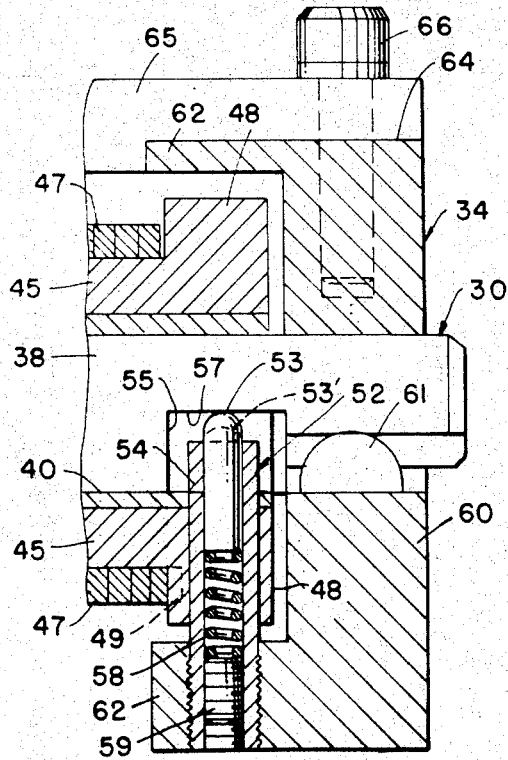
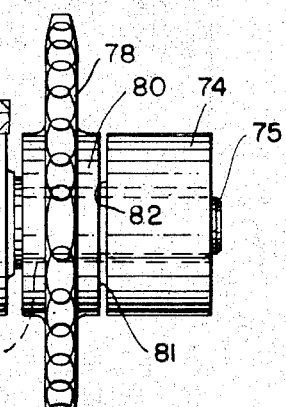

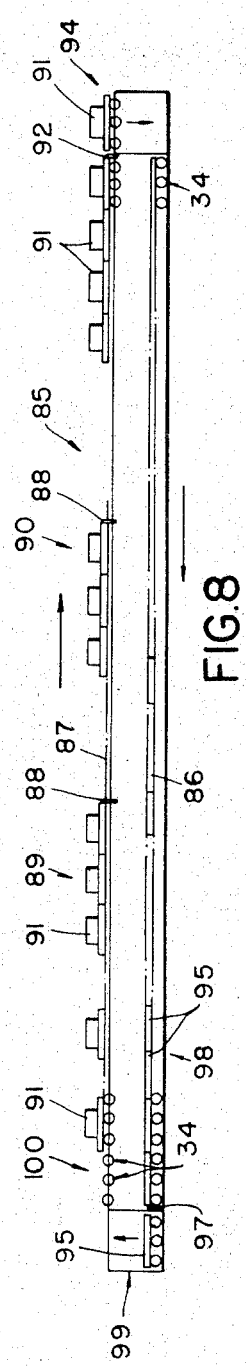
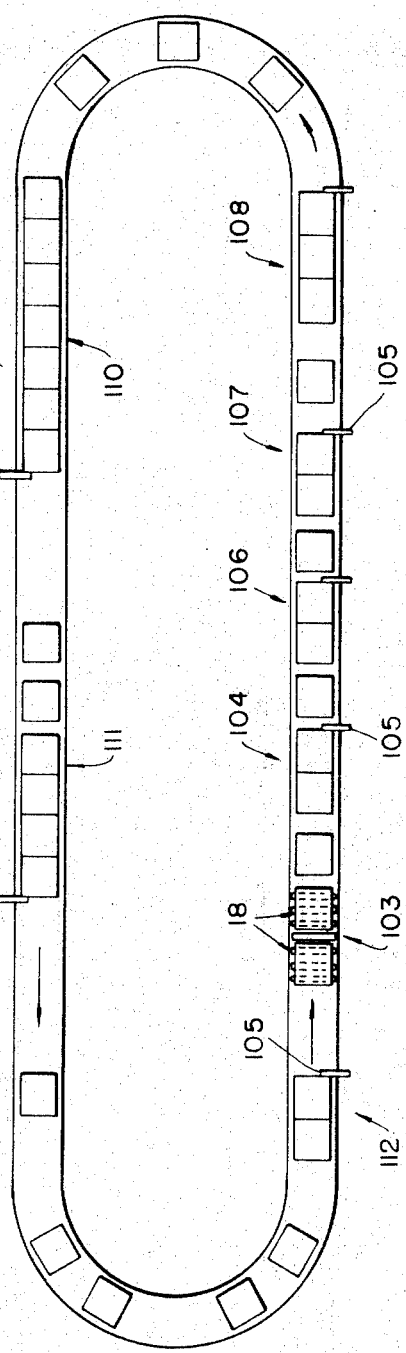

SHAFT DRIVER DEVICE AND CONVEYOR SYSTEM EMBODYING THE SAME

This is a division of application Ser. No. 698,533, filed Jan. 17, 1968, now U.S. Pat. No. 3,605,990.

BACKGROUND OF THE INVENTION

1. Field of the Invention

The invention has application, in an embodiment herein illustrated and described, in the field of what is termed live roller conveyors, as distinguished from gravity type roller conveyors. More particularly, applications in so-called accumulation conveyor systems are presently contemplated. However, the invention in its broadest aspect is applicable to many other fields in which it is desired to interrupt the drive of a rotatively powered shaft in immediate response to the arising of an overload on said shaft, frictionally occasioned or otherwise. An application in automated transfer equipment is illustrative.

2. Description of the Prior Art

In the field of accumulation and related type conveyors I am unaware of any prior art pertaining to a live roller conveyor system, in which the drive of a roller or rollers is, upon arising of a predetermined rotation-resisting load thereon, instantaneously interrupted by means incorporated in effect solely in the roller structure; i.e., independently of other external means employed in known arrangements.

Conveyor systems of the last named sort are the subject matter of patents to Burt U.S. Pat. No. 3,122,232 of Feb. 25, 1964, De Good et al U.S. Pat. No. 3,136,406 of June 9, 1964, De Good U.S. Pat. No. 3,156,345 of Nov. 10, 1964, and Fix U.S. Pat. No. 3,285,381 of Nov. 15, 1966. The equipment disclosed in all of these patents employs some sort of load feeler means, mechanically or electrically responsive to a halt of a load unit, to transmit a de-clutching action to a live roller of the system. That is, the halting of the drive is not solely in response to an increased frictional shaft drag alone, occasioned by the halting.

In specific regard to the releasable torsion spring clutching of a powered rotative input shaft to a rotative output shaft, there are of course many patents relating to spring-type overload release devices for this purpose. The most pertinent to the structure of the present invention appear to be Goff U.S. Pat. No. 2,468,193 of Apr. 26, 1949, and Gutterman U.S. Pat. No. 2,626,029 of Jan. 20, 1953. These relate, however, to simple tool devices, as distinguished from a conveyor system. Moreover, in regard to specific structural details, Goff and Gutterman fail to disclose the improved combination of resiliently operated clutch release feature, particularly where the clutch is itself a torsion spring type. Such is the subject matter of the more specific claims of the present application.

SUMMARY OF THE INVENTION

The invention, as embodied in particular in a live roller conveyor system, features a suitably supported system of conveyor rollers which support load units from beneath, directly or indirectly, for transport in a longitudinal direction, which load units are adapted to be halted from time to time, either automatically or manually by an operator, for the performance of some operation thereon while halted.

Due to the fact that the roller system is responsive without recourse to load sensing means or the like, as indicated above, it is of great simplicity, compactness and little cost. Further, in a preferred embodiment its roller provisions and a motorized drive therefor occupy a very small height above the floor; and such provisions are readily accessible for maintenance. Being free of external controls, electrical or mechanical, and other than a frictional drag effect, it is possible, when desired or necessary, for the operator or attendant to push a load unit or units back any desired distance, reversely of the normal travel direction thereof.

Of great importance is the fact that it is unnecessary, at any time to start or stop a prime mover of the installation, or to de-clutch its main and common driving connection to a number of roller units of the system.

The system is capable of handling many different types of loads, palletized or otherwise. While as indicated above, its rollers engage and drive the load units directly from beneath, this function may if desired be performed through the agency of a continuous load belt, in a known manner. However, in the interest of the desired compactness, particularly above-floor, such supplemental belt provisions may be omitted.

Pursuant to the principle of the invention, a simple spring adjustment adapts the system to handle load units in a wide range of weights, with varying sensitivity as to drag and with uniformly good efficiency.

BRIEF DESCRIPTION OF THE DRAWINGS

FIG. 1 is a fragmentary perspective view, partially broken away, showing a series of live rollers as incorporated and driven in a typical motorized conveyor system pursuant to the invention;

FIG. 2 is a fragmentary side elevational view adaptation of the invention in a continuous, horizontal, uniplanar loop system;

FIG. 3 is a view partially broken away and in section through the axis of a torsion spring-clutched and normally powered shaft and roller unit of the invention, as along line 3—3 of FIG. 4;

FIG. 4 is an end view of that unit, as from the right of FIG. 3, being partially broken away and in transverse vertical section on a line corresponding to line 4—4 of FIG. 3;

FIG. 5 is a fragmentary view in enlarged scale and in transverse vertical section on broken line 5—5 of FIG. 2;

FIG. 6 is an exploded view illustrating components of a typical shaft and roller drive unit which differs in certain aspects from what is shown in FIGS. 1-5;

FIG. 6A is a fragmentary sectional view showing a composite dual-sprocket and hub feature of the unit of FIG. 6;

FIG. 7 is a fragmentary view illustrating a control device in which the load drag-responsive de-clutching of the drive shaft is effected in an alternative manner, i.e., through the agency of magnetic means;

FIG. 8 is a schematic view in side elevation illustrating a typical embodiment of the invention in a straight line conveyor system employing parallel, vertically spaced, load advance and return reaches;

FIG. 9 is a schematic top plan view of another adaptation of the invention in a continuous, horizontal, uniplanar loop system; and FIG. 10 is a top plan view of a still further alternative embodiment in a single reach horizontal system.

DESCRIPTION OF PREFERRED EMBODIMENTS

FIGS. 1 and 2 show an illustrative embodiment of the equipment 10 of the invention in a single reach, horizontal live roller-type accumulation conveyor system, of the general type depicted in FIG. 10. This conveyor comprises an elongated upright frame, generally designated 11, typically comprised of corner uprights 12 braced by cross pieces 13 and mounting elongated front and rear roller supporting bar members 14 which parallel and are spaced transversely from one another. Elongated lower frame members 15 are sustained by the uprights 12, the members 15 supporting a horizontal platform 16 upon which motorized drive means, hereinafter described, are in turn sustained. In a known fashion, the frame members 12, 13, 14 and 15 may be constituted by channel sections, or the like; and it is to be understood that additional intermediate uprights corresponding to the corner uprights 12 are contemplated, in a number determined by the overall length of the system 10.

The front and rear supporting members 14 have means to journal the opposite ends of a number of live conveyor rollers, generally designated 18, pursuant to the invention, as well as a suitable number of idler rollers 19; and the longitudinal spacing between the axes of live rollers 18 is intended to be such that at no time will a load unit be free from the normal driving action of at least one of the rollers 18. Accordingly, the design of any system 10 will essentially and preferably depend upon the minimum lengthwise dimension (relative to its travel path) of any load unit, palletized or otherwise, intended to be handled by the system. It is further contemplated that the system 10 shall be equipped with a number of load halting devices, not shown in FIGS. 1 and 2 in the interest of simplicity and clarity, but of the nature shown in FIGS. 8, 9 and 10 of the drawings. Lacking such stop means, it is nevertheless contemplated that load units traversing the mechanism 10 may be manually halted by the operator or attendant.

As indicated above, the lower platform 16 of the frame 11 supports a speed reduction gear head 20 which is powered by an appropriately rated electric motor 21, through the agency of a motor-driven belt 22 trained about an input pulley 23 of reducer 20.

A sprocket 24 is fixed on the output shaft of the reducer; and a main driving chain 25 of the conveyor mechanism 10 is trained about the bottom of sprocket 24, passing upwards and to the left (FIG. 2) from sprocket 24 about a tension adjusting idler 26 journaled on an arm 27 of an appropriate adjusting bracket 28 welded to one of the bottom frame channels 15.

Chain 25 serves as a common drive for the live rollers 18 of the system 10, the shaft 30 of each of which is equipped, in the special manner hereinafter detailed, with a clutch-controlled power input sprocket 31 acting as a power-operated driver for the roller in question, from which sprocket 31 the roller 18 normally receives its drive via a drag-responsive spring clutch means, to be described. In being trained upwardly and horizontally about the sprockets 31, drive chain 25 is maintained in efficient drive engagement with those sprockets, for example by one or more cleats 32 welded to frame support channel 14, the number of these downwardly acting, chain restraining devices being determined in accordance with the overall length of the system 10, and the number of live rollers 18 incorporated therein.

As best illustrated in FIGS. 3, 4 and 5, each of the conveyor rollers 18 (shown in dot-dash line in FIG. 3 for simplicity) is powered during the normal driving phase by a shaft driving and control device pursuant to the invention, which is generally designated by the reference numeral 34. Roller 18 is suitably secured fixedly to the shaft 30, which shaft is a part of the device 34, being shown as journaled in appropriate transversely aligned and spaced bearing blocks or trunnions 35, bolted on and depending from the top frame members 14. A shaft retainer collar 37 is secured to shaft 30 directly outboard of the trunnion 35.

To the right of the other trunnion 36 (FIG. 3) the shaft 30 is reduced in diameter at 38; and reduced portion 38 is surrounded by successive tubular inner and outer bushings 39, 40, with a spacing washer 41 interposed between bushing 39 and the adjacent side of trunnion 36. The inboard bushing 39 serves as a bearing for the chain sprocket 31, which has an integral, axially extending first control hub member 42 of substantial length, both for added stability and to afford a cylindrical outer clutch surface 43, the purpose of which is hereinafter described.

The outer bushing 40 similarly journals an axially elongated second control hub member 45 having an external cylindrical clutch surface 46; and the clutch surface 43 of the hub member 42 on sprocket 31 and the surface 46 are encircled by the coils of a yieldable and resiliently operating releasable torsion clutch or coupling spring 47. One end coil of this spring lies adjacent an enlarged end flange 48 of hub 45, to which it is anchored, as by an axially offset lug 49 (FIG. 4), to the hub. The opposite end of coiled torsion spring 47 is offset a substantial distance radially outwardly at an extension control finger 50 (FIG. 3), being engaged at this radially extending member in the de-clutching operation of the shaft drive control device 34, in a manner hereinafter described. In the normal, sprocket driven action of that device, clutch spring 47 constrictively engages the clutch surfaces 43, 46 of the respective hub members 42, 45, with the result that the two are coupled for rotation as a unit under the drive transmitted by chain 25 to sprocket 31.

Hub member 45, as thus drivingly connected to the power source, normally transmits driving torque to shaft 30 through the agency of a resiliently acting coupling unit, generally designated 52, the nature of which is illustrated in FIGS. 3, 4 and 5, and which in response to a predetermined increase in frictional drag and yield of the coupling spring 47, de-couples hub members 42, 45 from one another for a relative rotative shift. Typically, unit 52 may comprise a plunger or tappet pin 53 slidable in a tubular guide sleeve 54 (FIG. 5), which sleeve extends into a recess 55 milled or otherwise formed in the enlarged flange 48 of hub 45. Sleeve 54 is received between opposite, circumferentially limiting sides of recess 55, in a manner to be able to transmit normal driving torque directly from hub 45 by means of pin 53, i.e., from sprocket hub 42 through the constricted torsion spring 47, a side wall of recess 55 of hub 45 and the sleeve 54, thus driving the roller shaft 30 through a collar connection of that shaft, to be described. A rounded end 53' of pin 53 engages against a flat radially extending surface 57 of recess 55, which surface, as appears in FIG. 4, is radially offset eccentrically from, but in radial alignment with, the axis of shaft 30. A coil compression spring 58 in sleeve 54 acts radially outwardly on pin or plunger 53; and the important function of spring 58 will be hereinafter described. It is backed radially outwardly by an adjusting set screw 59 (FIG. 5), which screw is threadedly received at the outer end of the pin guide sleeve 54.

The control device 34 is completed by an annular torque-transmitting collar 60 surrounding the outer end of the reduced diameter portion 38 of the drive shaft 30, the driving connection being effected in any appropriate way, as by a key 61. Collar 60 has an integral flange 62 axially inwardly overlapping and radially spaced from the enlarged flange 48 of hub 45; and the outer end of the sleeve 54 which guides pin 53 is threaded received in the flange 62. Sleeve 54 is received in hub recess 55 with pin 53 bearing against surface 57 of the recess so that the sleeve, as rigidly coupled to collar 60 in the latter's flange 62, and the spring-backed pin 53 constitute a torque-transmitting coupling between the collar and the outer hub 45 of device 34 in the normal driving phase of the latter.

That is, with the end 53' of pin 53 abutting the radially offset flat surface 57, of hub 45 i.e., eccentric of the axis of drive shaft 30, torque is normally transmitted to shaft 30 and roller 18, under a frictional drag load on shaft 30 below a predetermined critical value, from the motor and chain driven sprocket 31 and hubs 42, 45 (through the agency of the torsion spring 47 encircling the hub clutch surfaces 43, 46), thence through the pin 53 and the spring guide sleeve 54, collar 60 and key connection 61, as shown in FIG. 5. However, when the critical drag torque value is exceeded, pin 53 is depressed against the bias of its coil spring 58 so that hubs 42 and 45 rotate slightly relative to collar 60, with the result that the driving connection through torsion clutch spring 47 is instantaneously interrupted, in a manner and by means now to be described.

To this end, the torque transmitting collar 60 is provided with a chordal flat surface 64 (FIG. 4); and an axially extending clutch control arm or element 65 of substantial length is secured at one end to the collar at the flat 64, as by a lapped connection and locking screw 66. As shown in FIG. 3, the control arm 65 extends axially past the offset finger 50 of the torsion spring 47, being normally spaced a trifle, as indicated at "a" in FIG. 4, from that arm. The spacing is on the side of spring arm 50 forwardly of the direction of its normal clockwise rotation, indicated by the arrow in FIG. 4; and as operated by the first control member's torsion spring connection, the arms 65 and 50 interrupt the driving connection of the driver 31 and second control hub member 45.

Accordingly, it is seen that, upon depression of pin 53 under a shaft load in excess of the critical value, the spring finger 50 contacts control arm 65 of collar 60 in a clockwise direction as viewed in FIG. 4 with the result that torsion spring 47 is unwound ever so slightly in reference to the hub clutch surfaces 43, 46. The unwind or expansion is nevertheless sufficient to interrupt the driving connection between hub members 42 and 45 (FIG. 3). In consequence, hub member 45 is instantaneously de-clutched from drive by the sprocket 31, which continues to idle on the bushing 39 without interruption of its own drive by the chain 25. Shaft 31 and roller 18 are de-clutched to halt the latter beneath the load; and drive is resumed just as soon as the drag load on the roller and shaft drops below the critical value, usually upon freeing the load unit for continued advance on the system or mechanism 10.

The drag torque may be great or small, depending upon the load, i.e., from a value capable of being overcome by a finger grip on roller 18, up to a value far in excess of that. Any setting in such a range, at which the pin 53 will yield, with instantaneously de-coupling, may be made by a simple manipulation of set screw 59 (FIG. 5) to vary the compression of spring 58. This can be done in a system incorporating many live rollers 18 in a minimum of "down" time.

FIG. 6 of the drawings is an exploded view showing in a general way the components of a control device 34', substantially the same as the device 43, which has been described above, in the main utilizing the same reference numerals. However, FIG. 6 differs from what is shown in FIG. 3, in that a compound dual sprocket and hub arrangement is illustrated.

Thus, the sprocket hub member, specially designated 42', is formed integrally on a barrel-like, hollow cylindrical body 67 which has an integral and radially enlarged flange 68 apertured to receive a number of bolts 69. There are two like sprocket members 70 and 71 spaced axially by a ring member 72; and the members 70, 71 and 72 have holes corresponding in number and spacing to those of flange 68 to receive the bolts 69, the holes of sprocket member 71 being tapped for this purpose.

As depicted in FIG. 6a, the assembly of hub member, sprockets and spacer is rotatably mounted on shaft 30, with bushings 73 interposed. The functioning of the device 34' involves other components such as are shown in FIGS. 3, 4 and 5. The dual sprocket arrangement of FIGS. 6 and 6a affords a desirable degree of standardization in respect to the ability of hub-carrying member 67 to receive sprockets of different design.

As appears from the foregoing, the concept of drive shaft and roller control clutch means, illustratively in a live roller conveyor system, is considered to be perhaps the most important aspect of the present invention, not limited in particular in regard to the specific nature of the drag-controlled clutch means interposed between the shaft and a prime mover. FIG. 7 illustrates schematically a very simple arrangement for the prupose, utilizing a magnetic field for the coupling means.

Thus, a driving disk 74 of substantial mass may be keyed or otherwise drivingly connected to a reduced diameter end portion 75 of the driven shaft 76, the latter being journaled in a frame-supported bearing block or trunnion 77. The sprocket 78 is mounted on shaft member 75 for free rotation thereon, as by a bushing 79.

Pursuant to the embodiment of FIG. 7 the sprocket 78, at least at its hub portion 80, and the driver disk 74 present facing surfaces at 81 and 82, respectively, which are permanently magnetized, or may each have a series of magnets embedded therein. The respective magnetic surface means are polarized north and south, and disk 74 and sprocket 78 are restrained against axial movement relative to shaft 76 or one another. Accordingly, upon the chain drive of sprocket 78 (or any other corresponding type of drive means), the magnetic field existing between the magnetized portions occasions a drive of the shaft-connected disk 74, with consequent rotation of shaft 76 and the load roller or other means 83 connected thereto.

The degree of magnetization of the members 74 and 78 of course determines the strength of the field, hence the critical value at which the field yields, under restrictive shaft drag, to de-couple the shaft-keyed disk 74 from driver 78. Adjustment of the critical value is readily effected by replacing the drive disk 74 with another of greater or lesser effective magnetization, in relation to that of driver 78. It is also contemplated that the disk member 74 might be electromagnetically energized, with the possibility of effecting a desired adjustment of the magnetic coupling field by varying the electrical input from an appropriate source.

FIGS. 8, 9 and 10 depict three types of possible roller conveyor systems in which the roller drive de-coupling arrangement of the invention may be employed. FIG. 8 shows schematically an installation 85 in a straight line, floating palletized system having vertically spaced and parallel, rectilinear lower and upper reaches 86, 87, respectively, the latter of which is equipped with longitudinally spaced stop devices 88, manually or automatically operated, at certain stations. It is to be understood that, although not appearing in FIG. 8, each such station incorporates a series of the roller and roller control devices 34, which are in such longitudinal spacing from one another that no load unit is ever out of engagement with at least one such device.

Typically, the stations might be a first assembly station 89, a second assembly station 90, at both of which an assembly operation is performed, with an accumulation of palletized load units 91 halted by the respective stop devices 88. Another stop device 92 is shown adjacent the right hand end of upper reach 87, behind which load units 91 accumulate, as in temporary storage, prior to proceeding to a pickup station at 94, where the loads are removed from their respective pallets 95.

The latter are then lowered to the level of bottom conveyor reach 86 by means of suitable elevator-type means (not shown), whereupon a push forwards the same onto the first or right hand (FIG. 8) set of live roller devices 34. Like reach 87, the reach 86 has a number of such sets, along which the empty pallets are transported to the left, accumulating behind a rear stop member 97 at what may be considered a pallet storage station 98.

Upon release of stop 97, the pallets travel onto rollers at a part loading and elevator station 99, where load units 91 are placed on the pallets, the load and pallet then being elevated, by means not shown, to the level of upper reach 87. A push to the right places the load units on a starting station at 100, upon which their travel proceeds to the right in the manner and for the purposes mentioned above.

FIG. 9 shows a typical installation 102 in a closed loop system, for example a foundry mold line. Considering station 103 as being a start station, at which the mold drag is placed on the rollers 18, the parts proceed to the right to an accumulated stop at station 104 behind a stop device 105, where the molding cores may be set in place in the drag, thence to a station 106, behind another stop, at which the mold cope is applied. Further stations at 107 may represent a weight setting or mold clamping station and a pouring station 108, each behind manually or automatically operated stops 105.

The poured molds then proceed, always under the drive of devices 34, about the right hand loop of the system 102, accumulating behind a stop 105 at a weight pick-off or unclamping station 110, then proceeding upon release of the stop to a cope pick-off station 111. The cycle is completed by powered travel of the load units around the left-hand bight of the loop, coming to rest at a drag pick-off station 112. The cycle repeats in the manner described above.

FIG. 10, on the other hand, schematically shows an installation 114 in a straight line, floating system, the start of conveyance of which is at a right-hand station 115. The load units proceed to accumulate behind a first automatic or manual stop 116, where or after which a machining operation may be performed. Following release, accumulation next takes place behind a metering stop 117, prior to proceeding to an assembly station, as at 118. Assembled parts then travel, roller driven as before, to accumulation in a final station 119 behind an end stop 120, where they may remain stored for a later operation, or if some succeeding part of the system is temporarily shut down.

Accordingly, it is seen that the invention, systemwise, has great versatility. It is also inherently compact and of low production cost, due to the improved nature of the individual devices 34, free from reliance on external control means and lack of need for belt power transmission. As indicated above, the power source or prime mover of any installation embodying a considerable number of the live rollers may operate uninterruptedly to continue the drive of all such rollers as are not halted. The power input sprocket of the halted roller simply idles about the shaft of the latter. It is of course contemplated that there may be other input members equivalent to the sprocket, such as a gear, a pulley, or the like.

As also indicated above, the principle of the invention has wide application in industry, over and above purely live roller types of accumulation conveyor systems, such as are illustrated in FIGS. 8, 9 and 10. For example, an application is contemplated in automated machine tool transfer equipment, in which systems of the type depicted in FIGS. 1 and 2 would extend, parallel to one another, between opposite parallel lines of machine tools past which workpieces are indexed step-by-step. The live roller units would effect the transportation at a desired rate of the workpieces, palletized or not, between opposite ends of the production lines, permitting loading of pallets, unloading or any other type of supply or maintenance function. An installation such as that referred to would replace known types of so-called power and free equipment which has been used for the purpose, with halted load units not subject to scuffing from beneath by continuously driven load rollers. Other installations will suggest themselves to those skilled in the art.

What is claimed is:

1. A control device to govern the drive of a rotative shaft subject to a variable drag under load, said device acting responsively to an increase in said drag about a predetermined value, and comprising means to releasably connect the shaft to a driver therefor in a manner to automatically interrupt the shaft drive solely in response to said increase in drag, said means comprising a first hub member surrounding said shaft and normally rotating with the shaft and driver, a second hub member surrounding said shaft coaxial with and coacting with said first member, and yieldable torsion spring means normally engaging and frictionally coupling said first and second members for rotation as a unit, said coupling means and one of said first and second members having means responsive to said predetermined increase in drag and a consequent yield of the coupling means to operatively de-couple the first and second hub members from one another.

2. A control device to govern the drive of a rotative power driven member subject to a variable drag under load, said device acting responsively to an increase in said drag above a predetermined value and comprising means to releasably connect said member to a driver therefor in a manner to automatically interrupt the drive of said member solely in response to said increase in drag, said means comprising a second control hub member normally rotating coaxially with said driven member and responsive to said drag increase, a first rotatable control hub member coaxial with said second control hub member and coupled together by yieldable torsion spring coupling means, resiliently acting means normally coupling said second and driven members for rotation as a unit, said second and driven members being rotatively shifted coaxially relative to one another in opposition to said resiliently acting means in response to said predetermined increase in drag, accompanied a yield of the torsion spring coupling means, said torsion spring coupling means rotating coaxially with said first and second members and including means actuated in response to said relative rotative shift to operatively disconnect said first and second control hub members from one another and thereby interrupt the rotative drive of said driven member.

3. A self-contained shaft drive control device, comprising a rotatable shaft, a power-operated driver coaxial with said shaft, and releasable clutch means coaxially rotatable with said shaft and driver in a normal, power-driven operation of the shaft, said driver being mounted for rotation relative to the shaft upon release of said clutch means, said clutch means comprising a second control member coaxial with said shaft, resiliently acting means normally coupling said control member with said shaft for an impositive drive of the latter through said second control member, a first control member coaxially mounted on said shaft for rotation therewith or relative thereto and fixed to said driver resiliently acting means yielding in response to a resistance to rotation of said shaft in excess of a predetermined value, said members rotating relative to said shaft upon said yielding, a torsion spring normally acting to drivingly couple said control members for rotation as a unit, and means operated by said second control member and engaging said torsion spring upon said relative rotation of the second control member and shaft to interrupt the driving coupling of the first and second control member by said torsion spring.

4. The device of claim 3, in which said second control member comprises a hub encircling said shaft in end-to-end relation to said first control member, said torsion spring normally acting on said hub and a coaxial hub of the driver which constitutes said second control member, the second control member being provided with an element engageable with an end of said torsion spring upon said relative rotation of said second control member and shaft, the opposite end of said torsion spring being anchored by said second control member.

* * * * *